UNITED STATES PATENT OFFICE.

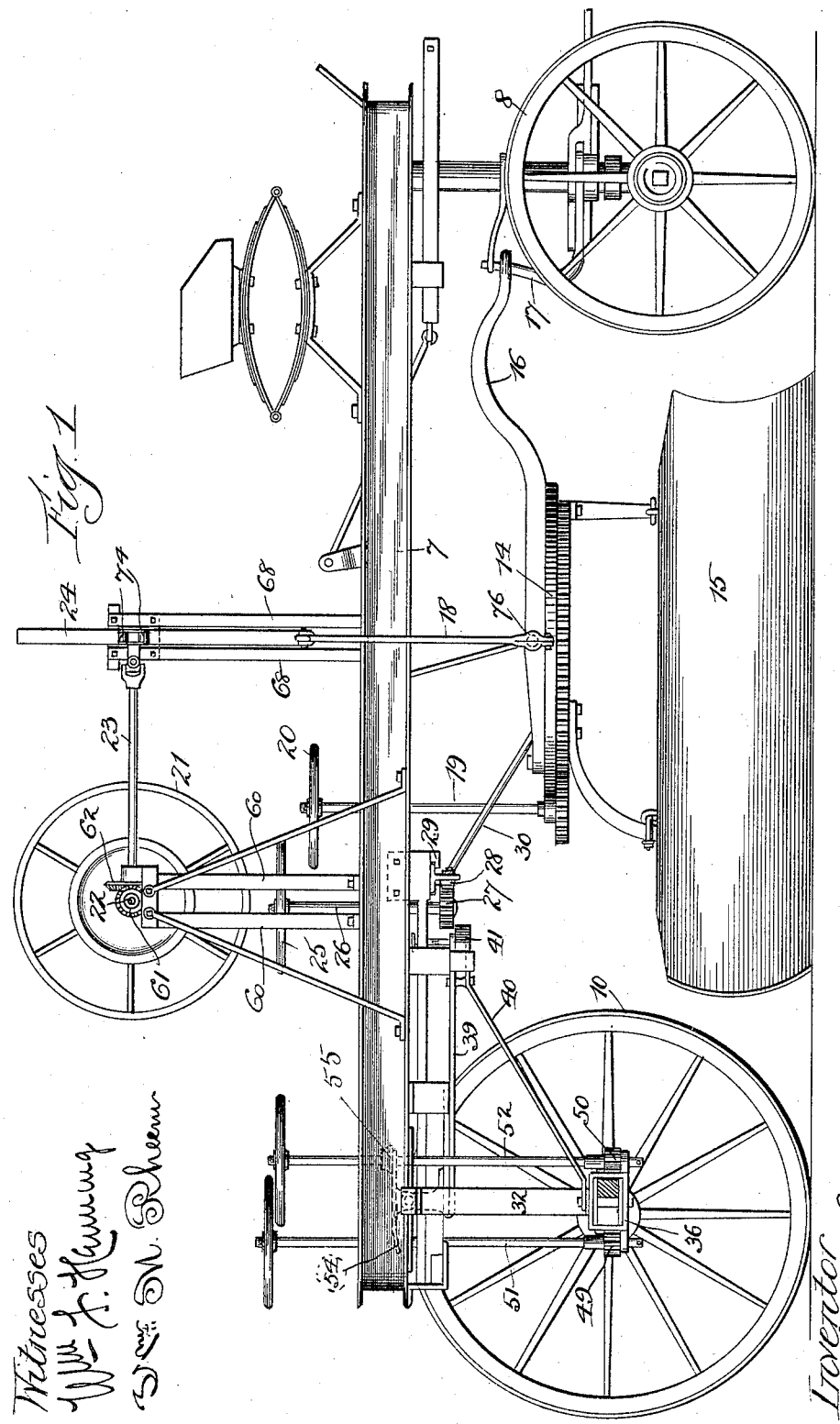

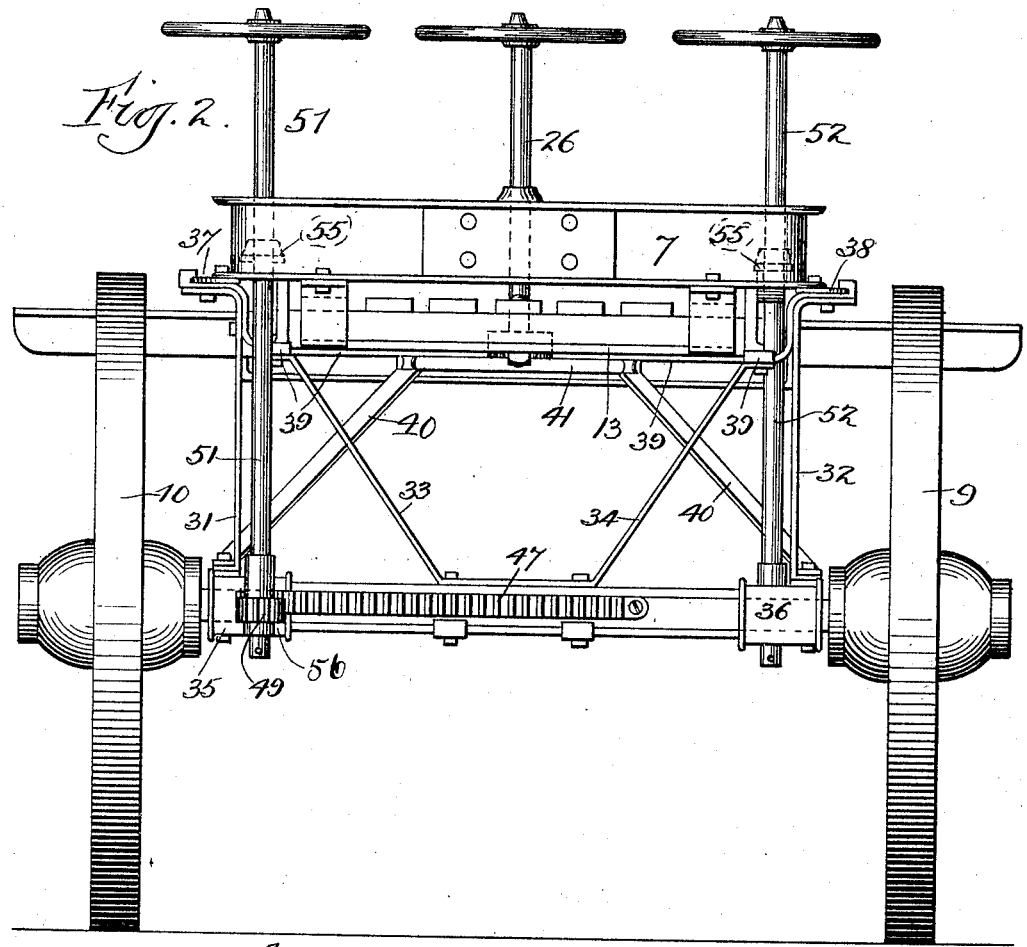
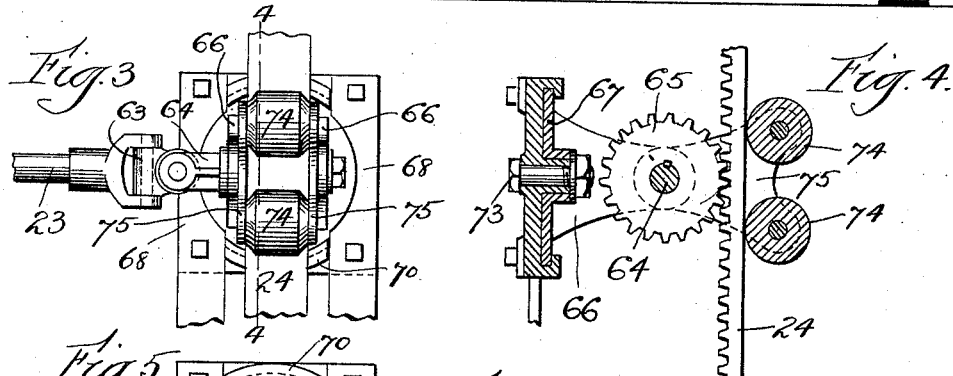
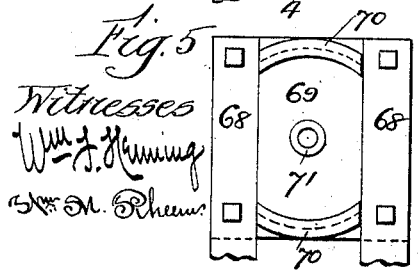

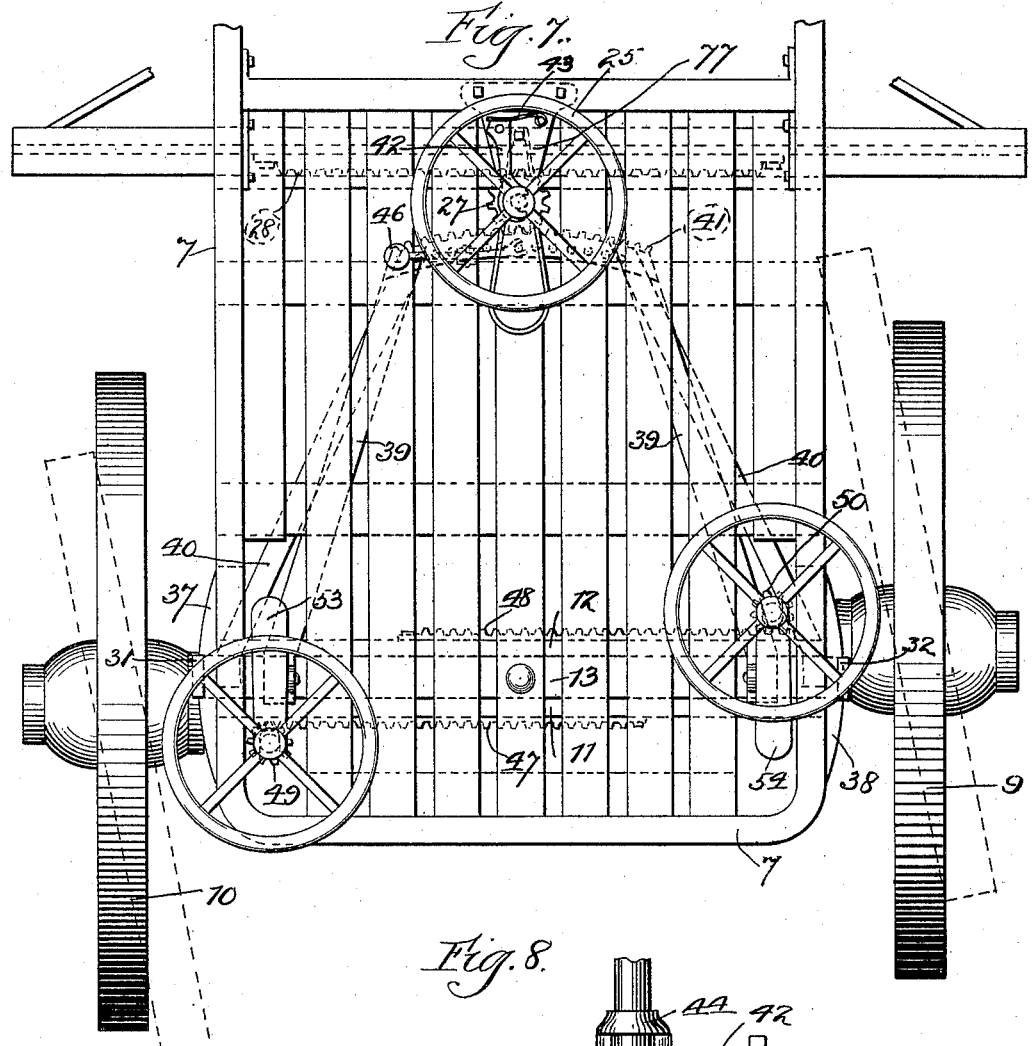

THOMAS RUEL McKNIGHT, OF AURORA, ILLINOIS, ASSIGNOR TO THE WESTERN WHEELED SCRAPER COMPANY, OF SAME PLACE.

ROAD-MACHINE.

SPECIFICATION forming part of Letters Patent No. 584,395, dated June 15, 1897.

Application filed November 30, 1895. Serial No. 570,712. (No model.)

*To all whom it may concern:*

Be it known that I, THOMAS RUEL MC-KNIGHT, a citizen of the United States, residing at Aurora, in the county of Kane and State of Illinois, have invented certain new and useful Improvements in Road-Machines, of which the following is a specification, reference being had to the accompanying drawings, in which—

Figure 1 is a side elevation, one of the rear wheels being removed. Fig. 2 is a rear elevation. Fig. 3 is an enlarged detail, being a side view of a part of the scraper-lifter mechanism. Fig. 4 is a section on line 4 4 of Fig. 3. Fig. 5 is a detail, being a side elevation showing the base-plate which supports part of the scraper-lifting mechanism. Fig. 6 is a plan view of one of the pinion-supports. Fig. 7 is a plan view of the rear portion of the machine; and Fig. 8 is an enlarged detail, being a partial longitudinal section showing the mechanism for securing the angular adjustment of the rear wheels.

My invention relates to road-machines, and has for its object to provide certain improvements in such machines, among which may be mentioned the provision of a scraper having an extensible rear axle with means for angularly adjusting the rear wheels and new and improved mechanism for mounting and adjusting the scraper-blade.

Other improvements will be more fully hereinafter pointed out.

That which I regard as my invention will be set forth in the claims.

Referring to the drawings, 7 indicates the frame of the machine, which is supported at its front end upon wheels 8 in any approved manner. At its rear end the frame 7 is supported upon wheels 9 10, secured upon the extensible members 11 12 of an axle, the central portion of which is indicated by the numeral 13.

14 indicates a scraper-frame, to which is secured a scraper-blade 15, said scraper-frame being secured by a gooseneck 16 and connecting device 17 to the front portion of the machine in the usual manner. The frame 14 is suspended by bars 18, and is adjustable by means of a rod 19, having a hand-wheel 20. The vertical adjustment of the scraper-blade 15 is secured by means of hand-wheels 21, mounted upon a shaft 22, journaled upon supports 60, rising from the frame of the machine, as shown in Fig. 1. The shaft 22 carries at its ends beveled gears 61, which mesh with beveled gears 62, mounted upon shafts 23, arranged longitudinally of the machine. The opposite ends of the shafts 23 are connected by universal joints 63 to shafts 64, upon which are mounted pinions 65, as shown in Fig. 4. Each of the shafts 64 is journaled in standards 66, rising from a base-plate 67, which is supported by standards 68, which rise from the frame of the machine, as shown in Fig. 1. The base-plate 67 is secured to supporting-standards 68 by a plate 69, which is secured to said standards 68 and is provided with curved angle-bars 70, which receive the curved ends of the base-plate 67, as best shown in Fig. 4. A central boss 71 is provided on the plate, which enters a suitable orifice 72 in the plate 67. A bolt 73, which passes through the orifice 72, firmly binds the plate 67 in place, as shown in Fig. 4.

24 indicates racks, one of which is arranged at each side of the machine, the lower ends of said racks being connected to the bars 18, and said racks mesh with the pinions 65, as shown. Said racks are held in mesh with the pinions 65 by means of rollers 74, which are journaled between plates 75, mounted upon the shafts 64, as shown in Fig. 4. Each pair of rollers 74 bears against the back edge of its respective rack 24, holding it in mesh with its pinion 65, as shown. By connecting the racks 24 to the shafts 23 by means of universal joints, as above described, they are given more freedom of action and the different adjustments of the scraper-blade do not interfere with the mechanism for vertically adjusting it, as in constructions heretofore used. To give further freedom of action to the scraper-blade, the frame 14 is connected to the bars 18 by means of ball-and-socket joints 76.

The frame 14 is shifted transversely by means of a hand-wheel 25, mounted upon a rod 26, which carries a pinion 27, meshing with a rack 28, arranged transversely of the machine and supported in a bracket 29, as shown in Fig. 1. By this arrangement the rack 28 may be moved transversely readily. The rack 28 is secured to the frame 14 by chains or bars 30, as shown in Fig. 1. By rotating the hand-wheel 25, therefore, the frame 14 may be adjusted laterally at pleasure. As best shown in Fig. 8, the rod 26 is vertically movable, so that the pinion 27 may be moved out of mesh with the rack 28, the object of which construction will be more fully hereinafter set forth. The rear portion of the frame of the machine is supported upon the rear axle by means of a bolster-frame, which, as here shown, is formed of vertical bars 31 32 and inclined bars 33 34, the bars 31 32 being secured upon sleeves 35 36 at the ends of the axle, the bars 33 34 being secured at their lower ends to the central portion 13 of the axle. The bars 33 34 may, if desired, be connected at their lower ends, as shown in Fig. 2, being formed from one bar which is bent to the required shape, or they may be constructed in any suitable manner. The bars 31 and 33 are connected at their upper ends, as are also the bars 32 and 34, being arranged to fit over segmental guide-plates 37 38, respectively attached to the sides of the frame 7, said guide-plates serving to guide the bolster-frame as it is adjusted angularly with reference to the frame 7, as will be hereinafter described. The bolster-frame has attached to it a forwardly-projecting frame consisting of bars 39 40, a segmental rack 41 being supported at the forward ends of said bars, said rack being arranged adjacent to the rack 28, but at a lower level, the arrangement being such that when the rod 26 is depressed to move the pinion 27 out of mesh with the rack 28 said pinion will be moved into mesh with the rack 41. This will enable the operator to angularly adjust the bolster-frame and consequently the rear wheels by rotating the hand-wheel 25. The rod 26 is held in its upper or lower positions by means of a forked arm 42, which is pivoted upon a suitable support 77, secured to the frame of the machine, as shown in Fig. 8, said support also forming a bearing for said rod 26.

43 indicates a spring which is adapted to bear against one end of the arm 42 to hold it in its different positions, the end of said arm being squared for the purpose. As shown in Fig. 8, the forked end of the arm 42 is adapted to receive the rod 26, and when said rod is in its uppermost position the arm 42 supports it through the instrumentality of a collar 44, which is secured upon said rod. To depress the rod 26, the arm 42 is moved out of engagement with it, when the rod will descend until the collar 44 rests upon the support 77. The pinion 27 will then be in mesh with the rack 41.

The rack 41 and bolster-frame are normally locked in position by a locking-pin 45, which is mounted in a fixed support in the frame of the machine and fits into holes provided in the rack 41, as shown in Fig. 7. A foot-lever 46 is provided, pivoted upon the frame of the machine and having one end which engages the pin 45, so that by depressing the foot-lever the pin 45 may be withdrawn from engagement with the rack 41, thus enabling the operator to unlock said rack at pleasure.

The rack 28, to which is connected the scraper-frame, is locked in position by a locking-pin 78, which passes through a suitable perforation in the frame of the machine and through registered perforations in the rack 28. The pin 78 is disengaged from said rack by a foot-lever 79, pivoted upon a suitable support 80 and connected to the pin 78, as shown in Fig. 8. A spring 81 exerts downward pressure on the pin 78.

As best shown in Fig. 7, the extensible members 11 12 of the axle are provided with racks 47 48, respectively, which are secured to such members and extend through the sleeves 35 36, respectively, as shown in Figs. 1 and 2. 49 50 indicate pinions mounted upon the lower ends of rods 51 52, respectively arranged at opposite sides of the machine adjacent to the sleeves 35 36. The rods 51 52 are vertically adjustable and may be moved vertically by foot-levers 53 54, which are supported upon the bolster-frame of the rear axle and engage collars 55, secured upon said rods, as shown in Figs. 2 to 7. The weight of the rods normally holds said rods in their lowermost position, but they may be readily raised by operating their respective foot-levers 53 54. When in their lowermost position, the pinions 49 50 mesh with fixed teeth 56, arranged in the sleeves 35 36 below the racks 47 48, but when the rods 51 52 are raised, as above described, the pinions 49 50 are raised out of mesh with the stationary teeth 56. By this construction the racks 47 48 may be locked at any desired point, inasmuch as when the pinions 49 50 are in their lowermost positions, by their engagement with the stationary teeth as well as with the teeth of the racks 47 48, respectively, the rotation of such pinions is prevented by such stationary teeth, consequently locking the racks 47 48 and the extensible members of the axle to which they are connected.

The mechanism above described for locking the members of the rear axle in place is described here, as I consider it the best known to me for the purpose, but I do not claim it, as it is not my invention.

So far as I am aware no one has heretofore produced a machine of this character provided with an extensible axle and with means for effecting an angular adjustment of such axle; neither has a machine been produced, so far as I am aware, in which common mechanism was provided for adjusting the scraper as well as the rear wheels. Therefore I do not wish to be limited to the specific details of the construction herein described, as many modifications may be made without departing from the spirit of my invention.

That which I claim as my invention, and desire to secure by Letters Patent, is—

1. In a road-machine, the combination with a frame, of an angularly-adjustable axle, a scraper-blade, and common mechanism for laterally adjusting said scraper-blade and for angularly adjusting said axle, substantially as described.

2. In a road-machine, the combination with a frame, an angularly-adjustable axle, and a rack secured thereto, of a pinion movable into engagement with said rack, and means for rotating said pinion to angularly adjust said axle, substantially as described.

3. In a road-machine, the combination with a frame, of an angularly-adjustable axle having a rack secured thereto, a scraper-blade-supporting frame, a rack connected thereto, a pinion adapted to mesh with each of said racks, and means whereby said pinion may be rotated, substantially as described.

4. In a road-machine, the combination with a frame, a transversely-movable rack 28 supported thereby, and a scraper-blade-supporting frame connected to said rack, of a pinion 27 meshing with said rack, an angularly-adjustable axle, and a rack 41 connected thereto, said rack 41 being adjacent to the rack 28 but on a different level therefrom, whereby the pinion 27 may be moved into engagement with either of said racks, substantially as described.

5. In a road-machine, the combination with a frame, a transversely-movable rack 28 supported thereby, and a scraper-blade-supporting frame connected to said rack, of a pinion 27 meshing with said rack, an angularly-adjustable axle, a rack 41 connected thereto, said rack 41 being adjacent to the rack 28 but on a different level therefrom, whereby the pinion 27 may be moved into engagement with either of said racks, and means for normally holding said pinion in engagement with the rack 28, substantially as described.

6. In a road-machine, the combination with a frame, and an axle, of a bolster supporting said frame upon said axle, and lateral guides engaging said bolster, substantially as described.

7. In a scraper, the combination with a carriage, and a scraper suspended thereunder, of racks suspending said scraper, plates 69 having bars 70, supports for said plates, plates 67, supports carried thereby, and pinions mounted upon said latter supports and meshing with said racks, substantially as described.

8. In a scraper, the combination with a carriage, and a scraper suspended thereunder, of racks suspending said scraper, plates 69 having bars 70 and lugs 71, supports for said plates, plates 67, supports carried thereby, and pinions mounted upon said latter supports and meshing with said racks, substantially as described.

THOMAS RUEL McKNIGHT.

Witnesses:
JOHN R. SIMPSON,
C. B. RUKGABER.